United States Patent
Kanellakis et al.

(10) Patent No.: US 10,616,751 B1
(45) Date of Patent: Apr. 7, 2020

(54) AD-HOC MOBILE COMPUTING

(71) Applicant: EMC IP Holding Company LLC, Hopkinton, MA (US)

(72) Inventors: Kelly G. Kanellakis, Toronto (CA); Said Tabet, Sherborn, MA (US); Dragan Savic, Brookline, MA (US); Adrian Michaud, Carlisle, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 15/898,443

(22) Filed: Feb. 17, 2018

(51) Int. Cl.
*H04W 8/00* (2009.01)
*H04W 4/02* (2018.01)
*H04W 84/18* (2009.01)
*H04W 4/40* (2018.01)

(52) U.S. Cl.
CPC ............ *H04W 8/005* (2013.01); *H04W 4/02* (2013.01); *H04W 84/18* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 6,765,495 B1* | 7/2004 | Dunning | ................ | G08G 1/161 340/435 |
| 2013/0343256 A1* | 12/2013 | Zakrzewski | ............ | H04W 8/26 370/312 |
| 2014/0010173 A1* | 1/2014 | Zakrzewski | ............ | H04W 8/26 370/329 |
| 2014/0185503 A1* | 7/2014 | Roy | .................. | H04W 52/0216 370/311 |
| 2014/0286178 A1* | 9/2014 | Roy | ...................... | H04W 24/08 370/252 |
| 2015/0296404 A1* | 10/2015 | Sharma | ............. | H04W 28/0215 370/230 |
| 2016/0142898 A1* | 5/2016 | Poitau | ................... | H04W 76/14 370/329 |
| 2016/0150465 A1* | 5/2016 | Jung | .................... | H04W 48/16 370/254 |
| 2016/0192273 A1* | 6/2016 | Oren | .................... | H04W 40/244 370/329 |
| 2017/0150296 A1* | 5/2017 | Jung | ................... | H04L 12/1886 |
| 2017/0202001 A1* | 7/2017 | Guo | ....................... | H04W 84/10 |
| 2018/0310309 A1* | 10/2018 | Koskela | ................ | H04L 5/0053 |
| 2018/0341691 A1* | 11/2018 | Ekbom | ................. | G06F 16/178 |

* cited by examiner

*Primary Examiner* — Donald L Mills
(74) *Attorney, Agent, or Firm* — Ryan, Mason & Lewis, LLP

(57) ABSTRACT

Systems and methods are provided for generating and managing ad-hoc mobile computing networks. For example, a method includes discovering, by a first mobile compute node, an existence of a second mobile compute node within a geographic location monitored by the first mobile compute node, and exchanging data between the first and second mobile compute nodes to negotiate conditions for forming a cluster of a mobile ad-hoc network. The conditions include, for example, a target purpose for forming the cluster, criteria for compute node membership within the cluster, and designation of one of the first and second mobile compute nodes as a master compute node for the cluster. The cluster including the first and second mobile compute nodes is then formed based on the negotiated conditions.

20 Claims, 4 Drawing Sheets

AD-HOC MOBILE COMPUTING

FIELD

This disclosure relates generally to techniques for data processing in mobile computing environments.

BACKGROUND

Many types of businesses or systems that operate in harsh, remote, or dynamic environments (e.g., mining, agriculture, etc.), typically do not have access (e.g., sufficient network connectivity capabilities) to connect to an information network or data center to run mission critical tasks. Indeed, there are various use cases and circumstances (e.g., disaster and emergency services, advanced logistics services, harsh environment resource services, etc.) that may require higher performance computing and network communications capabilities beyond what is locally available at the location where the computing or network connectivity is required by a given computing node (e.g., motor vehicle). For example, a computing system within a motor vehicle may need to run an application or create a data set which exceeds the processing, network, or storage capabilities of the computing system of the motor vehicle.

SUMMARY

Illustrative embodiments of the invention include methods for generating and managing ad-hoc mobile computing networks. For example, one embodiment includes a method which comprises: discovering, by a first mobile compute node, an existence of a second mobile compute node within a geographic location monitored by the first mobile compute node; exchanging data between the first and second mobile compute nodes to negotiate conditions for forming a cluster of a mobile ad-hoc network, wherein the conditions comprise (i) a target purpose for forming the cluster, (ii) criteria for compute node membership within the cluster, and (iii) designation of one of the first and second mobile compute nodes as a master compute node for the cluster; and forming the cluster comprising the first and second mobile compute nodes based on the negotiated conditions.

Other embodiments of the invention include, without limitation, systems and articles of manufacture comprising processor-readable storage media, which are configured for generating and managing ad-hoc mobile computing networks.

DETAILED DESCRIPTION

Illustrative embodiments of the invention will now be explained in further detail with regard to systems and methods for generating and managing ad-hoc mobile computing networks comprising a plurality of dynamically generated compute clusters. Embodiments of the invention enable high-performance data processing through dynamic generation of mobile ad-hoc edge environments by pooling compute resources of computing nodes (e.g., mobile compute nodes and stationary compute nodes) which are dynamically clustered in both space and time dimensions, as needed. Ad-hoc mobile computing networks are dynamically generated and configured to support edge computing by performing data processing locally at the edge of the network (e.g., data from vehicle sensors, cameras, radar images, etc.) to support various applications such as, e.g., disaster response systems, adapting to specific situation or events, allowing for advanced computations to occur where the compute power of a single mobile element (typically a vehicle) does not have enough compute power for the task alone, etc.

Figure 1:
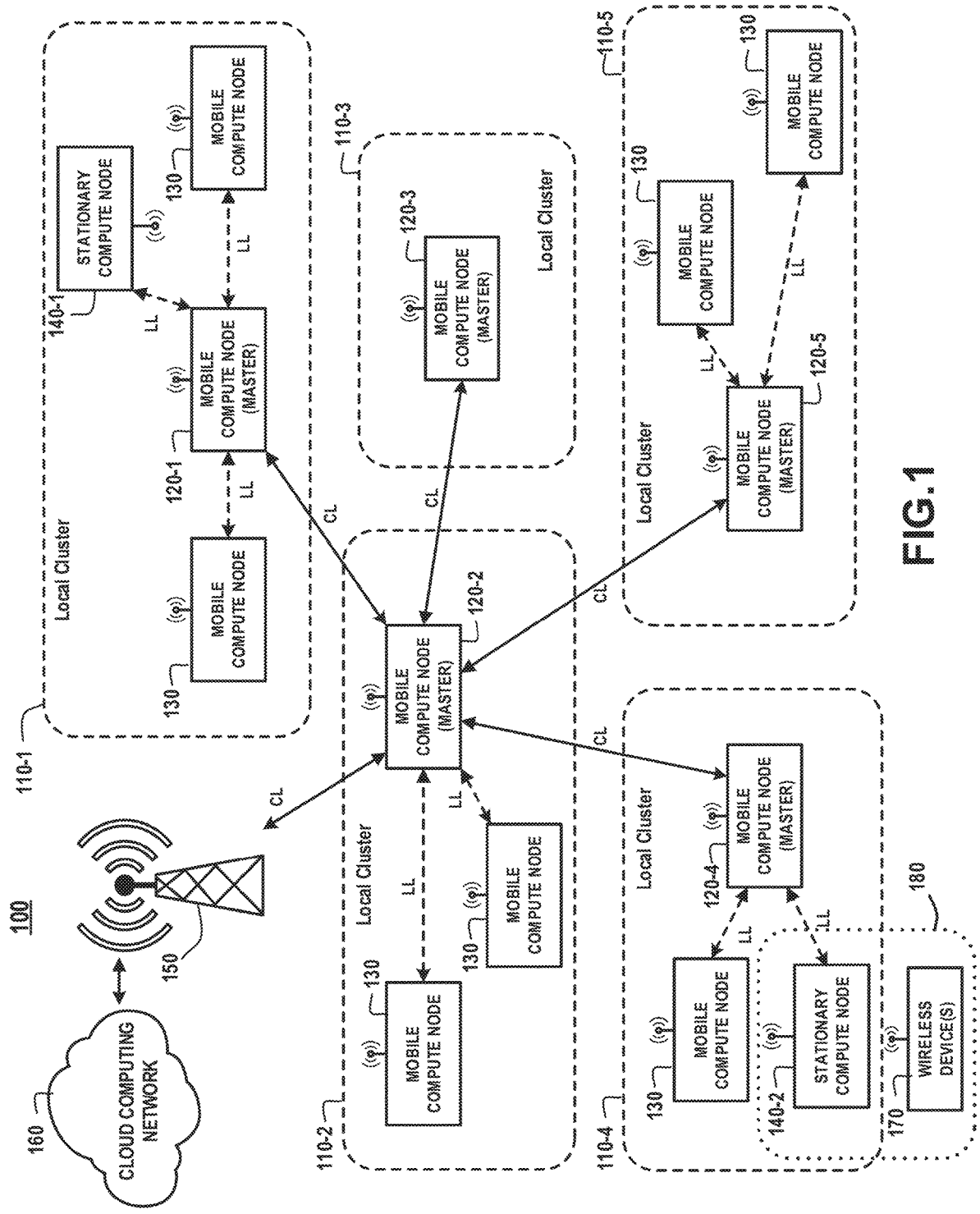
FIG. 1 is a high-level schematic illustration of an ad-hoc mobile computing network comprising a plurality of dynamically generated clusters of compute nodes, according to an embodiment of the invention.

FIG. 1 is a high-level schematic illustration of an ad-hoc mobile computing network comprising a plurality of dynamically generated clusters of compute nodes, according to an embodiment of the invention. More specifically, FIG. 1 illustrates an ad-hoc mobile computing network 100 which comprises a plurality of local clusters 110-1, 110-2, 110-3, 110-4, and 110-5 (collectively referred to as local clusters 110). The local clusters 110 are dynamically formed to include groups of heterogeneous mobile compute nodes and/or stationary compute nodes, which collaborate to perform various data processing functions. The local clusters 110 can collectively function as an ad-hoc mobile data center, providing various functions including, but not limited to network connectivity, high performance data processing, data/information exchange between compute nodes, and/or data storage services. The local clusters 110 are configured to handle dynamically changing connections between spatially distributed mobile and stationary compute nodes. The term "mobile compute node" as used herein is broadly meant to denote any type of system, device, vehicle, etc., which comprises a computing system and which is movable or in motion (e.g., a car is deemed a mobile compute node if it is moving or if it is parked). On the other hand, the term "stationary compute node" as used herein is broadly meant to denote any type of system, device, building, structure, etc. which comprises a computing system that remains in a fixed location and is not intended to be moved.

In the exemplary embodiment shown in FIG. 1, each local cluster 110-1, 110-2, 110-3, 110-4, and 110-5 comprises at least one mobile compute node 120-1, 120-2, 120-3, 120-4, and 120-5, respectively, which serves as a "master" mobile compute node for the given local cluster (collectively referred to as master mobile compute nodes 120). In addition, the local clusters 110-1, 110-2, 110-4, and 110-5 have one or more additional (non-master) mobile compute nodes 130, while the local cluster 110-3 has no additional (non-master) mobile compute nodes. The ad-hoc mobile computing network 100 further comprises one or more stationary compute nodes 140-1 and 140-2 (collectively, stationary compute nodes 140) which are included within the local clusters 110-1 and 110-4, respectively, and a wireless communications base station 150 (e.g., cellular CDMA_ or GSM cell site) which provides connectivity to a cloud network 160 (or other type of information network).

The master mobile compute nodes 120 within the different local clusters 110 communicate with each other through cluster links CL (denoted by solid bidirectional arrows). The master mobile compute nodes 120 communicate with other mobile compute nodes 130 and stationary nodes 140 within the same local cluster using local links LL (denoted by dashed bidirectional arrows). It is to be understood that FIG. 1 depicts a state of the ad-hoc mobile computing network 100 at a given point in time and that the number of local clusters 110 and constituent compute nodes 120, 130, and 140 within a given local cluster can dynamically vary over time. For example, since the local cluster 110-3 comprises only one mobile compute node 120-3, the cluster 110-3 can be terminated, and the master mobile compute node 120-3 can be merged into another local cluster (e.g., local cluster 110-2) and function as a non-master mobile compute node 130.

In particular, the dynamic creation of the local clusters 110 is driven by planned, dynamic and/or temporal compute workloads. The mobile compute nodes 120 and 130 within the local clusters 110 form clustered entities that are created based on applications that are planned, dynamic, and/or temporal. The mobile compute nodes 120 and 130, which are in close proximity and connected in local clusters, use multiple wireless or/and wired data technologies, to deliver information or compute capability, as required. Once formed, the lifecycle of local cluster can last for any given period of time from seconds to days, weeks or longer, until the given tasks (workloads) are completed, terminated, or postponed, due to lack of cluster computing power (or any other reasons).

The stationary compute nodes 140-1 and 140-2 (e.g., edge analytic servers) can be connected to local clusters (e.g., local clusters 110-1 and 110-4, as shown in FIG. 1) to deliver information, local services, and/or additional compute resources/capability, as required, for a given mobile local cluster, as mobile compute nodes pass through zones in proximity to the stationary compute nodes 140. In addition, some wireless devices 170 of users (e.g., smart phones, laptops, tablets, etc.), which are network connected to the stationary compute node (e.g., Wi-Fi connection) can form a local cluster 180, which is effectively connected to the ad-hoc mobile network 100. To provide high-speed, resilient and trustworthy ad-hoc network (AHN) connectivity, the local links LL and cluster links CL can be implemented using single or multiple wired, wireless and light-modulation signal processing technologies to enable connectivity of the compute nodes within the clusters 110.

The exemplary embodiment of FIG. 1 shows one example of a target purpose of the ad-hoc mobile network 100 in which the master mobile compute node 120-2 of the local cluster 110-2 provides network access and connectivity to the cloud computing network 160 to all compute nodes within the mobile ad-hoc network through a wireless cluster link to the wireless base station 150. In particular, as shown in FIG. 1, the mobile compute nodes 130 within the cluster 110-2 can access the cloud computing network 160 through network connectivity with the master mobile compute node 120-2. In addition, the master mobile compute nodes 120-1, 120-3, 120-4, and 120-5 in the other local clusters 110-1, 110-3, 110-4, and 110-5 can access the cloud computing network 160 through the network connectivity (CLs) with the master mobile compute node 120-2 in the local cluster 110-2. Likewise, the non-master mobile compute nodes 130 and the stationary compute nodes 140 in the local clusters 110-1, 110-4, and 110-5 can access the cloud computing network 160 through network connectivity (LLs) with their respective master mobile compute nodes 120-1, 120-4, and 120-5.

The mobile ad-hoc network 100 shown in FIG. 1 enables bandwidth consolidation and limits a number of wireless communication channels with the wireless base station 150, while allowing all compute nodes within the clusters 110 to access the cloud computing network 160 through one or a reduced number of wireless channels between the wireless base station 150 and the ad-hoc network 100. Furthermore, in one embodiment, in the example system 100 of FIG. 1, the master mobile compute node 120-2 can be configured to provide real-time data compression and decompression of data that is transmitted to and received from cloud computing network 160 through the wireless base station 150. The exchange of compressed data between the master mobile compute node 120-2 and the wireless base station 150 serves to reduce the communication bandwidth.

The exemplary ad-hoc mobile computing network framework depicted in FIG. 1 enables the formation of ad-hoc mobile data centers (mDC), which can be dynamically configured in both space and time dimensions (where needed, when needed, as long as needed), responding to disasters, adapting to specific situations or events, operating in harsh environments to service specific needs as those requirements are defined by nodes in the cluster or others who can access the clusters' mDC capabilities. In addition, the ad-hoc mobile computing network framework depicted in FIG. 1 provides a novel solution for data processing in mobile, ad-hoc edge environments. With this framework a "mobile thread" can exist within one mobile compute node or can expand to as many compute nodes (e.g., mobile and/or stationary) within one or more local clusters, as necessary, and can move in space and last as long as needed. A mobile thread can process anywhere with at least one mobile compute node executing the thread. By clustering mobile and stationary compute nodes, the ad-hoc mobile computing network allows the data processing system to obtain more processing power which may be necessary for a given task. In addition, by connecting to the stationary compute nodes 140 and to the wireless base station 150, the data processing system can be readily supported by the requisite backbone connectivity, e.g., multi-cloud services or just network connectivity. Further, the data processing system can provide services (in some cases potentially limited) to network connected devices and other assets within ad-hoc network environment. In this regard, the mobile ad-hoc computing is based on the integration of multiple sources of information (which may be incomplete), which are continuously updated with real-time data.

The ad-hoc mobile computing network framework depicted in FIG. 1 provides a novel technique of delivering computing services, and supporting artificial intelligence ("AI") capabilities that cannot be supported by a single individual compute node, for use in various conditions including real-time streaming of data analytics or in harsh environments. The cluster formation and termination is dynamic based on, e.g., movement, processing capabilities, and processing requirements, of the mobile and stationary compute node. The cluster formation is also based on distance and communication capability between the compute nodes. Initially, a cluster is formed by identifying compute nodes, which are in a given proximity and which can be linked to dynamically form a compute cluster. Once potential compute nodes to form a given cluster are identified, the compute nodes can exchange information including security/privacy determination, followed by higher level interchange of capabilities and requirements.

The specific requirements and definitions for cluster security, privacy and encryption, etc., will vary depending on factors including, but not limited to, workload requirements, privacy laws in the specific geography the cluster is operating in, and specific agreements that have been established for each compute node. A specification of cluster computing capabilities, which is separate from the specification of node computing capabilities, can be determined by the workloads being executed by the cluster to address specific needs of the workloads. For a cluster to form, at least one workload must exist which has at least one mobile thread. A workload can include multiple mobile threads, each of which can exist in different nodes within one or more local clusters.

Figure 2:
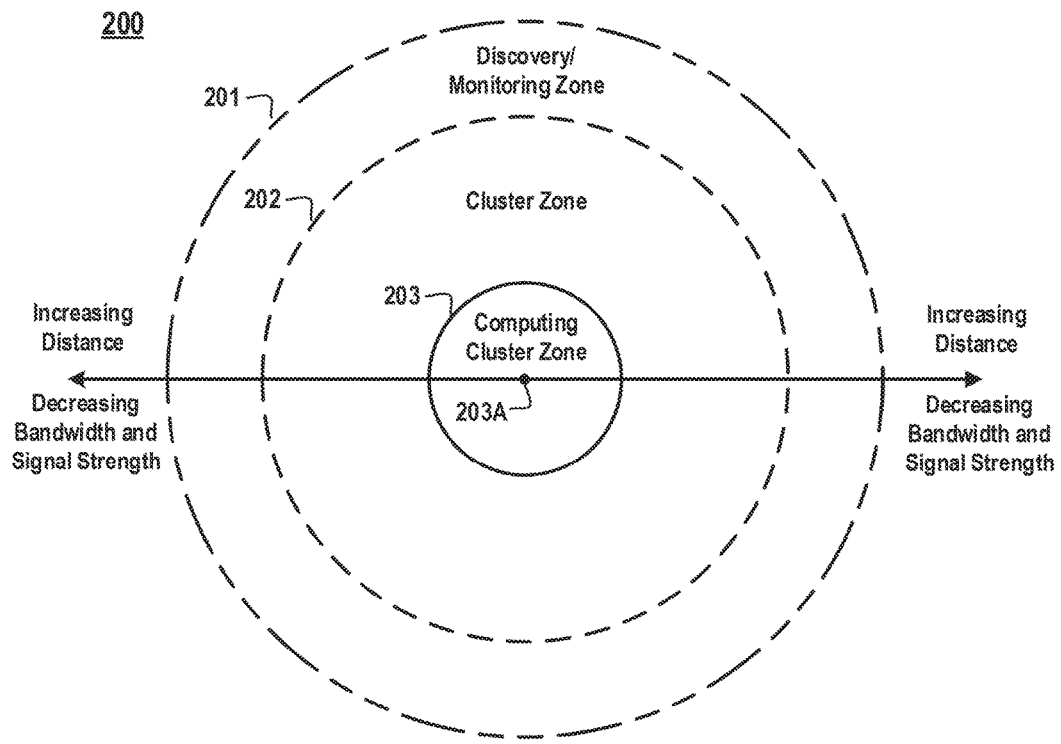
FIG. 2 schematically illustrates a method for defining different zones within a local cluster of an ad-hoc mobile computing network, according to an embodiment of the invention.

FIG. 2 schematically illustrates a method for defining different zones within a local cluster of an ad-hoc mobile computing network, according to an embodiment of the invention. In particular, FIG. 2 illustrates a local cluster 200 of a multi-layer wireless ad-hoc mobile computing network, wherein the local cluster 200 comprises three zones 201, 202, and 203. The first zone 201 is referred to herein as a "discovery and monitoring" zone. The second zone 202 is referred to herein as a "cluster" zone (or "cluster connectivity" zone), and the third zone 203 is referred to herein as a "computing cluster" zone. In terms of functionality, the third zone 203 subsumes the first and second zones 201 and 202, and the second zone 202 subsumes the first zone 201.

More specifically, the first zone 201 covers the largest distance of the local cluster 200. The first zone 201 is utilized by a master compute node (e.g., master mobile node) of the local cluster 200 as a "discovery and monitoring zone" in which the master compute node will determine (1) the existence and identity of other compute nodes within the local cluster 200, and (2) the acceptability of the other identified nodes in joining the cluster to pool computing resources, based on predefined criteria. In particular, as a new compute node enters the zone 201 and is discovered by the master compute node of the cluster 200, the master compute node will communicate with the newly discovered compute node to determine if the compute node has the requisite capabilities, or otherwise meets predefined criteria, for becoming a member of the cluster 200.

If the newly discovered compute node does not meet the conditions for becoming a member of the cluster 200, the master compute node will ignore the newly discovered compute node. On the other hand, if the master compute node determines that the newly discovered compute node does meet the conditions for becoming a member of the cluster 200, then the newly discovered compute node is placed on list of potential candidates, and the master compute node will track the new candidate compute node to determine if and when the candidate compute node enters the cluster connectivity zone 202.

Amongst other parameters and information that can be utilized by the master compute node, the global positioning system (GPS) location and wireless signal strength of candidate compute nodes near or within the zone 201 of the cluster 200 can be monitored to determine when a given monitored compute node could potentially move from the first zone 201 into the second zone 202 and move a step closer to become part of the local cluster 200. A double ended arrow shown in FIG. 2 is meant to denote an increasing distance, and a decreasing bandwidth and decreasing signal strength, relative to a central region 203A (e.g., location of master compute node of cluster 200), as a compute node within the cluster 200 moves further away from the central region 203A (e.g., further away from the master compute node of the cluster 200). While the various zones 201, 202, and 203 are shown as circles for illustrative purposes, it is to be understood that the outer boundaries (e.g., shapes) of the different zones 201, 202, and 203 will dynamically vary depending on the topology of the terrain (e.g., mountains, flat land, etc.) and the various structures (e.g. buildings, etc.) in proximity to, or otherwise within, the cluster 200.

As a candidate compute node enters the second zone 202 from the first zone 201, the master compute node can add the candidate compute node as a member of the cluster 200 in terms of network connectivity. As a member of the cluster 200 within the second zone 202, the compute node can utilize the cluster 200 for backbone connectivity to an information network, share and exchange various types of information (e.g., location data, sensor data, map information, etc.) with other member compute nodes within the cluster 200. The compute nodes within the second zone 202 are connected (since bandwidth is deemed high enough for efficient data exchange), and capable of exchanging data and sharing backbone connectivity.

In the second zone 202, an initial step is exchanging security and privacy information, to determine the potential of the compute node for joining the local cluster. If the security and privacy information exchanged is suitable to both compute nodes, the compute nodes are dynamically added to the local cluster 200. Further, as noted above, compute nodes can also form a "local service area" (e.g., region 180, FIG. 1) where other wireless devices (e.g., wireless devices 170) of consumers can utilize the connectivity of the cluster 200 to consume various services.

Furthermore, a member compute node can be dynamically removed from the cluster in circumstances where the master node anticipates that the member compute node will be moving outside the cluster 200 soon. For example, if a member compute node is determined to be rapidly moving through the cluster zones from the third zone 203 to the second zone 202 and toward the outer first zone 201, the master compute node can disconnect the member compute node from the cluster 200 as the compute node moves through the second zone 202 toward the first zone 201. In this regard, it is to be noted that spatial proximity and anticipated length of time within the cluster zones 202 and 203, for example, are factors that are considered in determining when a compute node should be added or removed from the cluster 200. It is to be noted that as long as there are at least two compute nodes within the third zone 203, a compute node is not considered to be in the second zone 202.

The third zone 203 (computing cluster zone) maintains the highest bandwidth and lowest latency connectivity, allowing the computing resources of multiple compute nodes to be merged or otherwise aggregated into a distributed computing platform that manages, pools, and shares the compute capabilities, connectivity and, persistent storage resources among the compute nodes that are network connected within the third zone 203. The dynamically forming computing platform operating within the third zone 203 can process workloads (comprising at least one mobile thread) which are not suited (e.g., exceed computing capabilities) for execution by a single compute node. In addition, the third zone 203 can support "local service areas", as described above. Various types of available compute nodes are dynamically added and removed to and from the third zone 203 as processing capabilities are needed and as compute capacity (and nodes) exists. As a given workload is completed, the processing results from the given workload can be stored in one or more of the compute nodes within the compute cluster as needed.

As noted above, spatial proximity and anticipated length of time within the second and third zones 202 and 203, for example, are factors that are considered in determining when a compute node should be added or removed from the cluster 200 in terms of connectivity. In addition, spatial proximity and anticipated length of time within the third zone 203, as well as requisite computing capabilities and resources, are factors that are considered in determining if a given compute node can become a member of a shared computing platform that is dynamically configured within the compute cluster zone 203 of the cluster 200. Indeed, if a given compute node is anticipated to be temporarily present within the third zone 203 for a short period of time which is insufficient to take advantage of the computing resources of the given node for the target compute task and anticipated workloads, then the master compute node can disregard that compute node as a candidate for joining the shared computing platform within the third zone 203.

Figure 3:
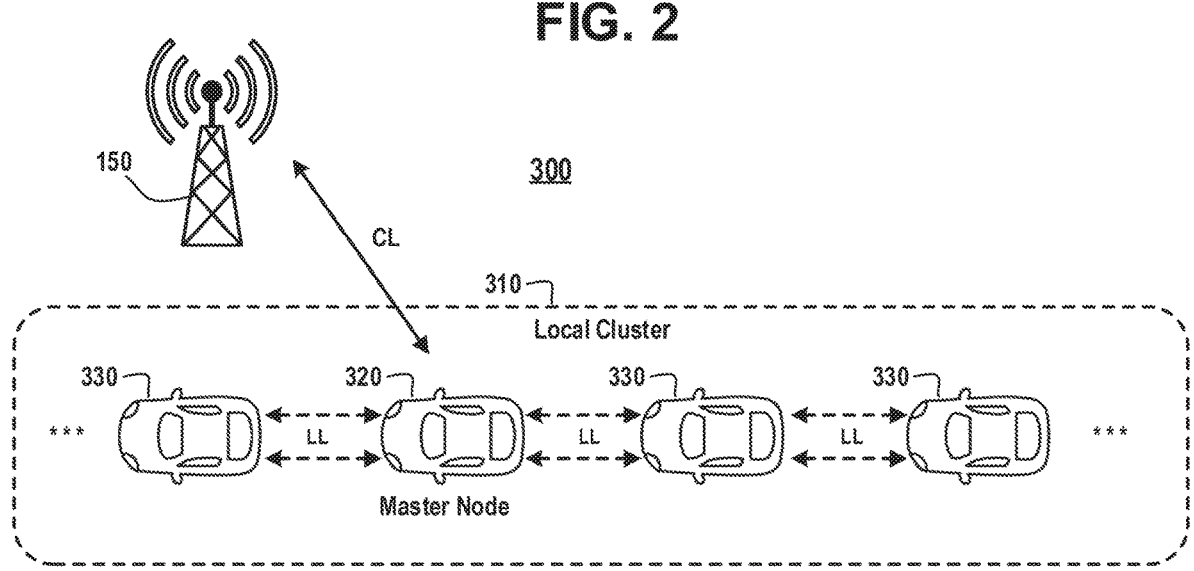
FIG. 3 schematically illustrates a method for establishing local network connections between mobile compute nodes within a local cluster of an ad-hoc mobile computing network, according to an embodiment of the invention.

FIG. 3 schematically illustrates a method for establishing network connections between mobile compute nodes within a local cluster of an ad-hoc mobile computing network, according to an embodiment of the invention. In particular, FIG. 3 schematically illustrates an ad-hoc mobile computing network 300 comprising a local cluster 310 comprising a plurality of network connected mobile compute nodes 320 and 330, wherein the mobile compute node 320 is deemed to be the master mobile compute node. In the example embodiment of FIG. 3, the mobile compute nodes 320 and 330 are depicted as motor vehicles which are network connected in a daisy-chain configuration using light-modulated local links LL. In this example embodiment, light-modulated local link LL connectively is established using head lights and tail lights of the vehicles (mobile compute nodes 320 and 330) as light transmitters and receivers. In particular, the motor vehicles are configured to communicate with each other using light-modulated signals that are emitted and received via photonic emitters and sensors that are integrated with the head lights and tail lights of the motor vehicles. On the other hand, a cluster link CL is established between the master mobile compute node 320 and wireless base station 150 using any suitable wireless communication protocol. In this regard, the ad-hoc mobile computing network 300 is implemented as a multilayer wireless and light beam-based ad-hoc network.

Figure 4:
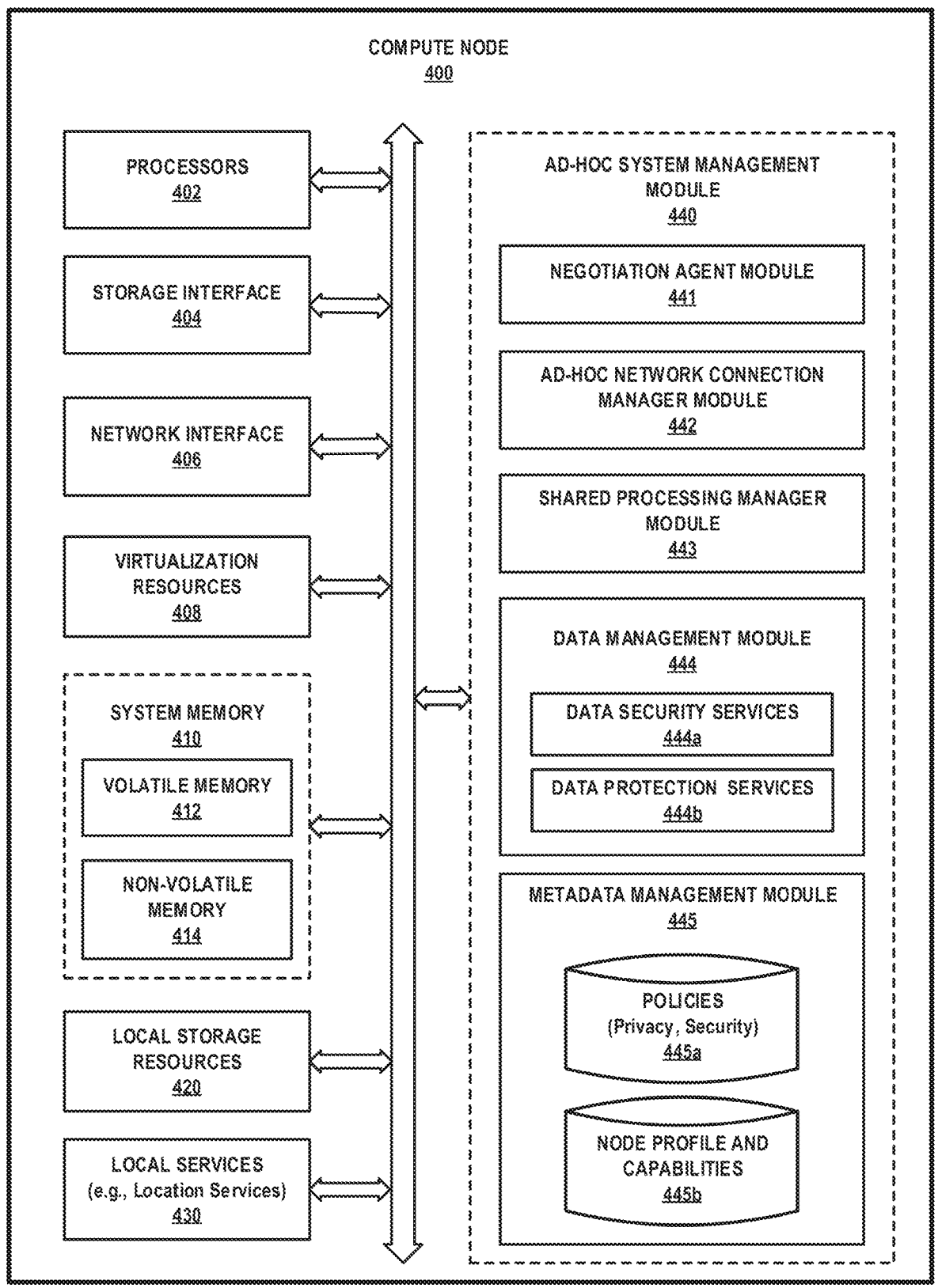
FIG. 4 schematically illustrates a compute node which is configured to operate within an ad-hoc mobile computing network, according to an embodiment of the invention.

FIG. 4 schematically illustrates a compute node 400 which is configured to operate within an ad-hoc mobile computing network, according to an embodiment of the invention. The compute node 400 comprises hardware processors 402, storage interface circuitry 404, network interface circuitry 406, virtualization resources 408, system memory 410, local storage resources 420, local services 430 (e.g., location services using a global positioning system (GPS) or otherwise), and an ad-hoc system management module 440. The system memory 410 comprises volatile memory 412 and non-volatile memory 414. The ad-hoc system management module 440 comprises a negotiation agent module 441, an ad-hoc network connection manager module 442, a shared processing manager module 443, a data management module 444, and a metadata management module 445. The data management module 444 comprises a plurality of submodules to provide data security services 444a and data protection services 444b. The metadata management module 445 manages various types of metadata including privacy and security policies metadata 445a and node profile and capabilities metadata 445b.

In one embodiment, the constituent components of the ad-hoc system management module 440 comprises software modules that are persistently stored in a storage device and loaded into the system memory resources (e.g., volatile memory 412 and/or non-volatile memory 414), and executed by the processors 402 to perform respective functions as described herein. In this regard, the system memory 410 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 402 comprise one or more hardware processors that are configured to process program instructions and data to execute a native operating system (OS) and applications/services that run on the compute node 400. For example, the processors 402 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 404 enables the processors 402 to interface and communicate with the system memory 410, the local storage resources 420 (e.g., hard disk drive, SSD (solid state drive) storage device, remote memory/storage resources on other compute nodes, etc.) using one or more standard communication and/or storage control protocols to read data from or write data to volatile and non-volatile memory/storage devices. The network interface circuitry 406 enables the compute node 400 to interface and communicate with a network and other system components. The network interface circuitry 406 comprises network controllers such as network cards and resources (e.g., wired/wireless network interface cards, I/O adaptors, converged ethernet adaptors, etc.) to support communication protocols and interfaces including, but not limited to, PCI Express (PCIe), direct memory access (DMA), remote DMA (RDMA) data transfer protocols, wireless transmitter/receiver to support wide area network (WAN) and local area network (LAN) network connectivity and communication, etc.

The virtualization resources 408 can be instantiated to execute one or more applications or functions which are hosted by the compute node 400. For example, the virtualization resources 408 can be configured to implement the various modules and functionalities of the ad-hoc network management module 440. In one embodiment, the virtualization resources 408 comprise virtual machines that are implemented using a hypervisor platform which executes on the compute node 400, wherein one or more virtual machines can be instantiated to execute functions of the compute node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the compute node 400, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework., each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the compute node 400. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 410 comprises electronic storage media such as random-access memory (RAM), read-only memory (ROM), or other types of memory, in any combination. The term "memory" or "system memory" as used herein refers to volatile and/or non-volatile memory which is utilized to store application program instructions that are read and processed by the processors 402 to execute a native operating system and one or more applications that are executed on the compute node 400, and to temporarily store data that is utilized and/or generated by the native OS and application programs running on the compute node 400. For example, the volatile memory 412 of the system memory 410 may be a dynamic random-access memory (e.g., DRAM) or other forms of volatile random-access memory. The non-volatile memory 414 may comprise a NAND Flash storage device, a SSD storage device, or other types of next generation non-volatile memory (NGNVM) devices.

The ad-hoc system management module 440 is configured to execute on the compute node to 400 to manage and control functions with regard to the compute node 400 joining an ad-hoc mobile network and operating within the ad-hoc mobile network. For example, the negotiation agent module 441 is configured to support agent-based negotiation functionalities that allow the compute node 400 to negotiate with other compute nodes for forming a local cluster or joining an existing local cluster. The negotiation agent module 441 provides information to the node cluster (e.g., a master compute node) regarding the privacy and security requirement of the compute node 400, the processing capabilities of the compute node 400, the workload requirements and services desired by the compute node 400 for joining the cluster (e.g., connectivity to a cloud system, additional processing resources to perform a given task, etc.). The compute node 400 can be accepted into a given cluster pending acceptance of other compute nodes in the cluster, which can be denied or granted based on the needs and workload requirements of the cluster.

In this regard, the negotiation agent module 441 negotiates with other negotiating agent modules of other compute nodes forming a cluster, wherein the negotiations are based on the compute nodes agreeing upon capabilities provided and services desired in each direction and can range from no capabilities provided and no services desired (no connection, or exchange) to full capabilities provided and all services desired (completely open bi-directional connection or/and computing cluster). The negotiation agent module 441 can exchange data privacy policies with other agents wherein the data privacy negotiations can occur based various data privacy policies which may exist between individual compute nodes or groups of compute nodes (e.g. fleets, subscribers to a service). Data privacy variables can include the types of data and metadata, retention policies, sharing policies (data mining restrictions), notification policies, computing policies, etc.

The ad-hoc network connection manager module 442 implements methods to support node discovery and cluster monitoring to identify compute nodes within geographical proximity that are capable of forming a cluster or otherwise joining an existing cluster. The ad-hoc network connection manager module 442 is further configured to create, manage, terminate, etc., a network connection between the compute node 400 and a cluster, and otherwise manage metadata associated with the network connection and the ad-hoc network to which the compute node 400 is connected.

The shared processing manager module 443 implements methods to allow the compute node 400 to share the local computing resources (e.g., processors, 402, virtualization resources 408, system memory 410, local storage resources 420, etc.) with other compute nodes within a cluster, as needed. In one embodiment, the shared processing manager module 443 implements methods and protocols for shared and distributed processing of compute resources between compute nodes within a given cluster, which are the same or similar to those methods and protocols which are utilized by a server cluster manager to enable sharing of sever resources within the server cluster.

The data manager module 444 implements methods that are configured to ensure the privacy and protection of data of the compute node 400. For example, the data security services module 444a implements methods for encrypting/decrypting data that is transmitted/received to/from other compute nodes within an ad-hoc network. The data protection services module 444b provides services that are commonly utilized to protect data in a network environment. As noted above, the metadata management module 445 manages various types of metadata including privacy and security policies metadata 445a and node profile and capabilities metadata 445b. The privacy and security policies metadata 445a and node profile and capabilities metadata 445b are accessed and utilized by the negotiation agent module 441 during a cluster negotiation process to provide information regarding the requisite privacy and security requirements, and the processing capabilities of the compute node 400.

Figure 5:
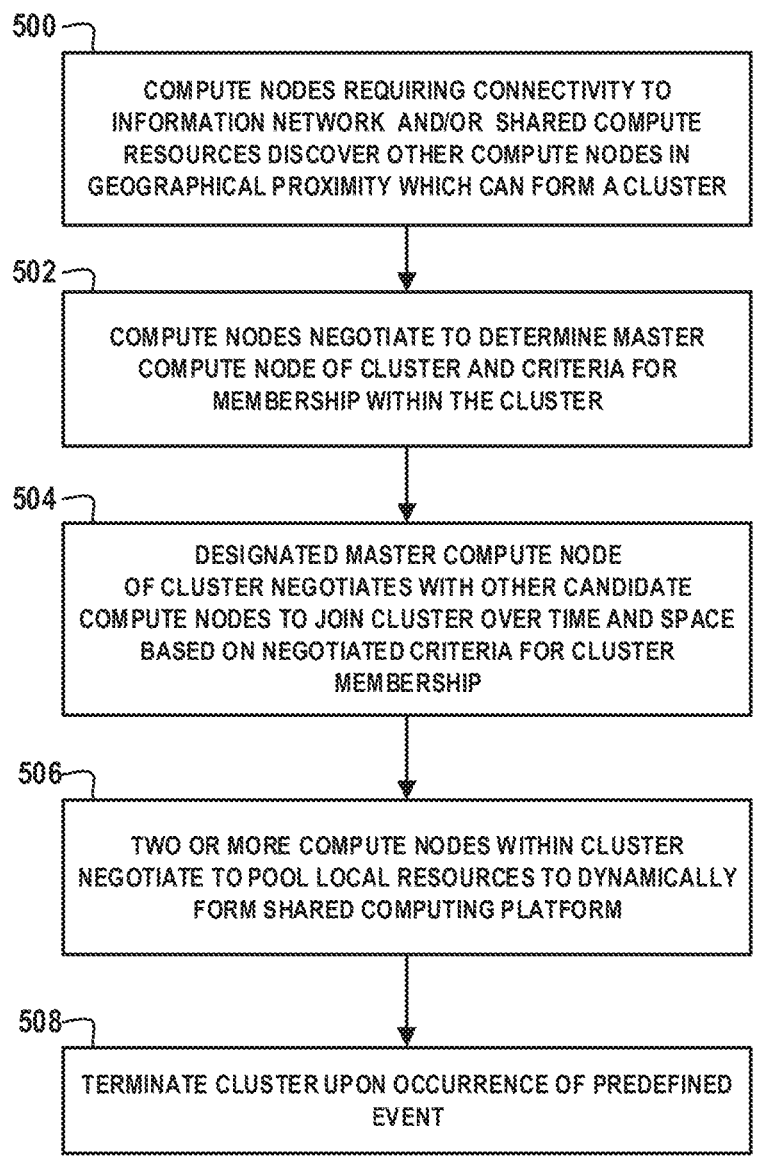
FIG. 5 is a flow diagram of a method for ad-hoc mobile computing network, according to an embodiment of the invention.

FIG. 5 is a flow diagram of a method for ad-hoc mobile computing network, according to an embodiment of the invention. As an initial step, assuming that no cluster exists, a plurality of compute nodes requiring connectivity to an information network, or wanting to exchange information for a certain purpose, and/or requiring shared computing resources to execute a given task, will perform a "discovery operation" to discover other geographically proximate compute nodes which can be ad-hoc network connected to form a cluster (block 500). The discovered compute nodes will enter into a "negotiation phase" to determine a master compute node for the cluster and to determine criteria for node membership within the cluster (block 502). For example, in one embodiment, the compute nodes will exchange data to negotiate conditions for forming a cluster, wherein the conditions comprise, for example, (i) a target purpose for forming the cluster, (ii) criteria for compute node membership within the cluster, and (iii) designation of one of the compute nodes as a master compute node for the cluster.

For example, a given compute node can be designated as a master compute node for the cluster based on a consideration of one or more factors including, but not limited to, (i) the strength and reliability of the network connectivity of the given compute node to a wireless base station (e.g., 4G or 5G wireless network) or cloud network so that the master compute node can readily provide the requisite backbone connectivity to allow other compute nodes in the cluster to access the wireless base station or cloud network through the master compute node, (ii) the data processing and storage capabilities of the given compute node being sufficient to support the requisite functionalities of a master compute node, (iii) the anticipated time that the given compute node will be a member of the cluster, (iv) whether the given compute node needs to execute a certain task with a workload that requires additional computing, storage and/or networking resources of other compute nodes in the cluster (i.e., pooling/aggregating node resources in a shared processing system), and (v) and other criteria which is deemed relevant to determining a suitable master compute node for a cluster, etc.

After forming the cluster, the designated master compute node of the cluster will negotiate with other candidate compute nodes to dynamically join the cluster, over time and space, based on the determined criteria for cluster membership as previously negotiated when forming the cluster (block 504). For example, as discussed above with reference to FIG. 2, the designated master compute node of the cluster will discover new compute nodes that move into the outer zone of the cluster and communicate with the newly discovered compute nodes to determine if they are candidates for joining the cluster. When the candidate compute nodes travel closer to the inner zones of the cluster, the master compute node can negotiate with the candidate nodes to determine if they should be included as members of the cluster at least with regard to network connectivity. At some point during the lifetime of the cluster, two or more member compute nodes within the cluster can negotiate with the master compute node to pool local their local resources to dynamically form a shared computing platform (block 506).

Furthermore, at some point, the cluster may be terminated upon the occurrence of a predefined event as agreed to during the initial negotiation phase (block 508). For example, the cluster can terminate if a given compute task or target purpose for which the cluster was created is completed. The cluster can terminate if a current master node leaves the cluster or is otherwise disconnected from the cluster due to technical problems or error conditions, and no other compute node within the cluster is capable of operating as the master compute node for the intended purpose of the cluster, etc. In one example, the workload of a given task can continue to exist if/when the original master leaves the cluster and a new master takes control of the cluster based on a voting process. In another embodiment, a cluster can be terminated when it is consumed or acquired by another cluster, in which case the master compute node of the cluster can become a non-master compute node in the new cluster.

In one embodiment, artificial intelligence (AI) methods can be used to facilitate cluster formation. In particular, a cluster can utilize various AI techniques to create micro services that are used to determine the optimal set of criteria for cluster membership for given set of circumstances and purposes for forming clusters, thereby allowing the requests of a compute node to be serviced by matching the requests from each node with the possible services that the cluster can provide. As compute nodes become part of a cluster, the compute nodes will go through training experiences to understand what the capabilities are of various nodes that join in clusters. Over time this training will provide an "experience journal" of what is possible, and therefore build digital twins of each node and their capabilities. This training is both static (e.g., the compute node gains experience directly through interaction with another node in a cluster) and dynamic (e.g., the compute node gains experience through communication with other nodes in a cluster, but without direct connection to the subject node).

In another embodiment a computing cluster (e.g., zone 203, FIG. 2) can utilize various AI techniques to provide "XaaS" ("X" as a service) to the "local service area". In this embodiment, the computing cluster essentially serves as a data center, with the added characteristics of being mobile and ad-hoc. In most data centers, the capabilities and capacities of the data center are well-planned over days, week, or months of planning. Adding workloads or new technologies or service capabilities is well considered in advance of the requirements. However, in a mobile/ad-hoc compute cluster, the same is not true. Indeed, workloads of a mobile/ad-hoc compute cluster can be determined within seconds and need to be instantly addressed. In many cases, the compute resources and capabilities to address these workloads are not present in a single node (e.g., vehicle), but may be addressed by creating a compute cluster, as discussed above. There still remains an issue that not all nodes within a given cluster will have the same capabilities, and not all capabilities are required by all workloads in the cluster.

Accordingly, X as a Service can address these issues. Indeed, by having a capability "X" available as a Service generically in the compute cluster, all workloads in that cluster can take advantage of that capability. For example, if a GPU is required to handle a specific AI algorithm, but the node requiring the AI task does not have that capability, as long as the compute cluster to which the node belongs is offering XaaS specifically for GPU, the workload can take advantage of that capability, without worrying about where the GPU resides. This also means that the cluster could potentially share one GPU among many workloads that require a GPU. Further, if there are multiple CPUs within the compute cluster, a single workload could utilize multiple GPUs concurrently to execute a task.

In another embodiment, the clusters and computing clusters can integrate the cluster computing resources into Smart City and IoT/Edge computing platforms, as edge processing resources and as a source of new data and new insights. An ad-hoc computing cluster complements existing Smart City capabilities and adds the unique architecture of a mobile ad-hoc data center that can interact with Smart City assets such as traffic lights, buildings, parking facilities, other public/private infrastructure and services such as emergency services.

The following are variety of use cases that would be enabled using an-hoc mobile computing methods as discussed herein. For example, ad-hoc mobile computing methods can be used to implement mobile factory automation/augmentation (intelligent supply chain, track-trace, connection to JIT (Just In Time) system linked end-to-end). In addition, ad-hoc mobile computing methods can be used to implement (i) Smart Cities, Smart Grids, Smart Transportation Networks (e.g., enhancing new autonomous vehicle applications); (ii) intelligent fleet vehicle management; (iii) agriculture and mining applications (coverage for rural areas); (iv) emergency vehicles in disaster areas to support disaster relief; (v) continuous "vehicle healthcare" monitoring and management (recalls, warranty, emergency services e.g. automated braking, failure detection, mobile digital services); (vi) ability to compensate for the lack of cognitive functions and/or lack of training data to create new or dynamic maps and directional/driving information; and (vii) clustering and learning from other vehicles and their context—continuous vehicle/transportation/traffic Control/public transit awareness.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
exchanging data between first and second mobile compute nodes to negotiate conditions for forming a local cluster of a mobile ad-hoc network, wherein the conditions comprise (i) a target purpose for forming the local cluster, wherein the target purpose comprises executing a workload, (ii) criteria for compute node membership within the local cluster, and (iii) designation of one of the first and second mobile compute nodes as a master compute node for the local cluster;
forming the local cluster comprising the first and second mobile compute nodes based on the negotiated conditions, wherein the first mobile compute node is designated as the master compute node, wherein the local cluster is associated with a plurality of zones, wherein each zone comprises an area that is defined at least in part by a spatial proximity to the master compute node, the plurality of zones comprising at least a first zone in which the master compute node and at least a subset of compute nodes comprising at least one of the second mobile compute node and one or more additional compute nodes, which are located within the first zone of the local cluster, are configured to form a computing cluster in which computing resources of member compute nodes within the computing cluster are shared and aggregated to form a distributed computing platform that is configured to execute the workload; and
controlling, by the master compute node, membership of the computing cluster by one of (i) dynamically adding a new member compute node to the computing cluster and (ii) dynamically removing an existing member compute node from the computing cluster.

2. The method of claim 1, wherein exchanging data comprises exchanging data regarding data security conditions and computing capabilities of the first and second mobile compute nodes.

3. The method of claim 1, wherein the target purpose further comprises providing network connectivity of the local cluster to an information network, and wherein the method further comprises:
establishing a cluster link between the master compute node and a wireless base station to wirelessly connect the local cluster to the information network;
establishing a local link between the master compute node and a non-master compute node within the local cluster; and
providing the non-master compute node network connectivity to the information network through the local link with the master compute node and the cluster link between the master compute node and the wireless base station.

4. The method of claim 3, further comprising:
establishing a second cluster link between the master compute node of the local cluster and a second master compute node of a second local cluster within the mobile ad-hoc network; and
providing the second master compute node network connectivity to the information network through the second cluster link to the master compute node of the local cluster and the cluster link between the master compute node and the wireless base station.

5. The method of claim 3, further comprising:
the master compute node compressing data received from the non-master compute node over the local link; and
the master compute node transmitting the compressed data on the cluster link to the wireless base station.

6. The method of claim 1, wherein:
the plurality of zones associated with the local cluster further comprises a second zone and a third zone;
the second zone comprises a cluster connectivity zone in which the master compute node controls network connectivity between the master compute node and a given compute node within the second zone to enable at least one of (i) network connectivity of the given compute node to an information network through the master compute node and (ii) network connectivity of the given compute node to other compute nodes of the local cluster;
the third zone comprises a discovery and monitoring zone in which the master compute node (i) determines an existence of a candidate compute node requesting membership in the local cluster and (ii) commences negotiation with the candidate compute node to determine whether to accept or deny membership of the candidate compute node in the local cluster;
the first zone subsumes functions of the second zone and the third zone; and
the second zone subsumes functions of the third zone.

7. The method of claim 6, further comprising:
determining, by the master compute node, an estimated amount of time that the candidate mobile compute node may be located within at least one of the first zone and the second zone of the local cluster; and
denying, by the master compute node, membership of the candidate compute node in the local cluster in response to the master compute node determining that the estimated amount of time that the candidate mobile compute node may be located within at least one of the first zone and the second zone is insufficient to assist in effectuation of the target purpose.

8. The method of claim 1, further comprising terminating the local cluster upon an occurrence of a predefined event as negotiated by the first and second mobile compute nodes.

9. The method of claim 8, wherein the predefined event comprises at least one of (i) the master compute node leaving the local cluster, (ii) a completion of the target purpose for forming the local cluster, and (iii) the local cluster being merged into a second local cluster.

10. The method of claim 1, wherein the first and second mobile compute nodes comprise motor vehicles.

11. The method of claim 10, wherein the first and second mobile compute nodes are configured to communicate using light-modulated signals that are emitted and received from head lights and tail lights of the motor vehicles.

12. The method of claim 1, wherein controlling, by the master compute node, membership of the computing cluster by one of (i) dynamically adding a new member compute node to the computing cluster and (ii) dynamically removing an existing member compute node from the computing cluster comprises:
determining, by the master compute node, an estimated amount of time that a given mobile compute node may be located within the first zone; and
adding the given mobile compute node as a member of the computing cluster in response to determining that the estimated amount of time is sufficient to aggregate and utilize the computing resources of the given mobile compute node as part of the distributed computing platform for executing the workload.

13. An article of manufacture comprising a non-transitory processor-readable storage medium having stored program code of one or more software programs, wherein the program code is executable by one or more processors to implement method steps comprising:
exchanging data between first and second mobile compute nodes to negotiate conditions for forming a local cluster of a mobile ad-hoc network, wherein the conditions comprise (i) a target purpose for forming the local cluster, wherein the target purpose comprises executing a workload, (ii) criteria for compute node membership within the local cluster, and (iii) designation of one of the first and second mobile compute nodes as a master compute node for the local cluster;
forming the local cluster comprising the first and second mobile compute nodes based on the negotiated conditions, wherein the first mobile compute node is designated as the master compute node, wherein the local cluster is associated with a plurality of zones, wherein each zone comprises an area that is defined at least in part by a spatial proximity to the master compute node, the plurality of zones comprising at least a first zone in which the master compute node and at least a subset of compute nodes comprising at least one of the second mobile compute node and one or more additional compute nodes, which are located within the first zone of the local cluster, are configured to form a computing cluster in which computing resources of member compute nodes within the computing cluster are shared and aggregated to form a distributed computing platform that is configured to execute the workload; and
controlling, by the master compute node, membership of the computing cluster by one of (i) dynamically adding a new member compute node to the computing cluster and (ii) dynamically removing an existing member compute node from the computing cluster.

14. The article of manufacture of claim 13, wherein exchanging data comprises exchanging data regarding data security conditions and computing capabilities of the first and second mobile compute nodes.

15. The article of manufacture of claim 13, wherein the target purpose further comprises providing network connectivity of the local cluster to an information network, and wherein the method further comprises:
establishing a cluster link between the master compute node and a wireless base station to wirelessly connect the local cluster to the information network;
establishing a local link between the master compute node and a non-master compute node within the local cluster; and
providing the non-master compute node network connectivity to the information network through the local link with the master compute node and the cluster link between the master compute node and the wireless base station.

16. The article of manufacture of claim 15, further comprising:
establishing a second cluster link between the master compute node of the local cluster and a second master compute node of a second local cluster within the mobile ad-hoc network; and
providing the second master compute node network connectivity to the information network through the second cluster link to the master compute node of the local cluster and the cluster link between the master compute node and the wireless base station.

17. The article of manufacture of claim 13, further comprising terminating the local cluster upon an occurrence of a predefined event as negotiated by the first and second mobile compute nodes, wherein the predefined event comprises at least one of (i) the master compute node leaving the local cluster, (ii) a completion of the target purpose for forming the local cluster, and (iii) the local cluster being merged into a second local cluster.

18. A mobile compute node, comprising:
system memory configured to store program code; and
at least one processor configured to execute the stored program code to instantiate an ad-hoc system management module which executes on the mobile compute node and is configured to perform a process comprising:
exchanging data with a second mobile compute node to negotiate conditions for forming a local cluster of a mobile ad-hoc network, wherein the conditions comprise (i) a target purpose for forming the local cluster, wherein the target purpose comprises executing a workload, (ii) criteria for compute node membership within the local cluster, and (iii) designation of one of the mobile compute node and the second mobile compute node as a master compute node for the local cluster;
forming the local cluster comprising the mobile compute node and the second mobile compute node based on the negotiated conditions, wherein the mobile compute node is designated as the master compute node, wherein the local cluster is associated with a plurality of zones, wherein each zone comprises an area that is defined at least in part by a spatial proximity to the master compute node, the plurality of zones comprising at least a first zone in which the master compute node and at least a subset of compute nodes comprising at least one of the second mobile compute node and one or more additional compute nodes, which are located within the first zone of the local cluster, are configured to form a computing cluster in which computing resources of member compute nodes within the computing cluster are shared and aggregated to form a distributed computing platform that is configured to execute the workload; and
controlling, by the master compute node, membership of the computing cluster by one of (i) dynamically adding a new member compute node to the computing cluster and (ii) dynamically removing an existing member compute node from the computing cluster.

19. The mobile compute node of claim 18, wherein exchanging data comprises exchanging data regarding data security conditions and computing capabilities of the mobile compute node and the second mobile compute node.

20. The mobile compute node of claim 18, wherein the target purpose further comprises providing network connectivity of the local cluster to an information network, and wherein the method further comprises:
establishing a cluster link between the master compute node and a wireless base station to wirelessly connect the local cluster to the information network;
establishing a local link between the master compute node and a non-master compute node within the local cluster; and
providing the non-master compute node network connectivity to the information network through the local link with the master compute node and the cluster link between the master compute node and the wireless base station.

* * * * *